Figure 1:
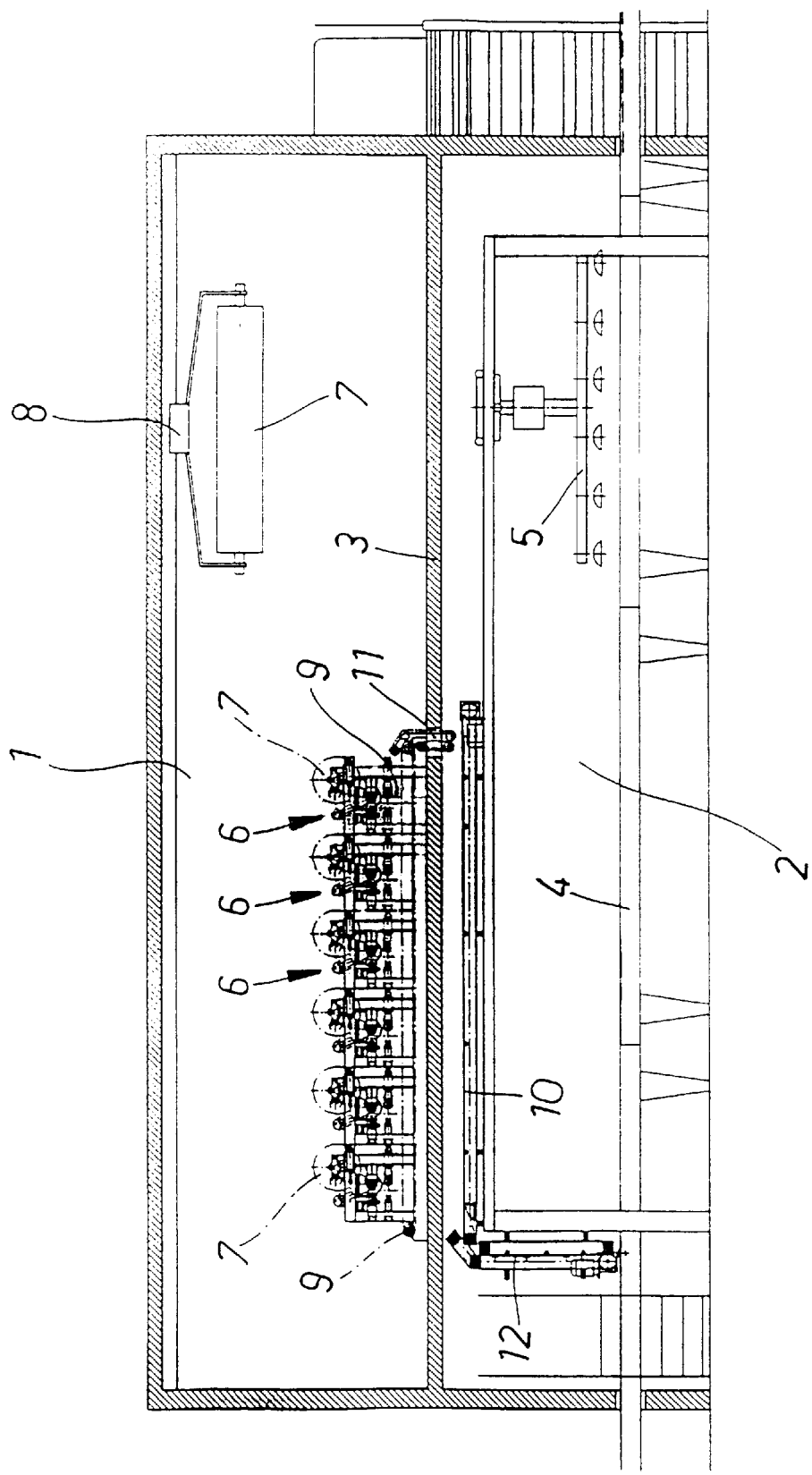

United States Patent
Lehto

[19]

[11] Patent Number: 5,906,695
[45] Date of Patent: May 25, 1999

[54] METHOD AND APPARATUS FOR LAMINATING GLASS SHEETS

[75] Inventor: Esko Lehto, Kangasala, Finland

[73] Assignee: Tamglass Engineering Oy, Tampere, Finland

[21] Appl. No.: 08/543,546

[22] Filed: Oct. 16, 1995

[30] Foreign Application Priority Data

Oct. 20, 1994 [FI] Finland ..................................... 944921

[51] Int. Cl.$^6$ ............................. B32B 17/10; C03C 27/12
[52] U.S. Cl. ........................... 156/80; 156/106; 156/322; 156/498; 156/499; 156/556; 156/580
[58] Field of Search .................................. 156/80, 84, 99, 156/106, 322, 498, 499, 104, 538, 556, 580; 242/564.3, 564, 562.1; 226/92, 5, 172

[56] References Cited

U.S. PATENT DOCUMENTS

| | | | |
|---|---|---|---|
| 4,267,140 | 5/1981 | Meeker | 264/291 |
| 4,368,087 | 1/1983 | Valimont et al. | 156/106 |
| 4,368,836 | 1/1983 | Meeker et al. | 226/172 |
| 4,655,870 | 4/1987 | Mori et al. | 156/322 |
| 5,066,352 | 11/1991 | Albers et al. | 242/564.3 |

FOREIGN PATENT DOCUMENTS

| | | |
|---|---|---|
| 7999282 | 1/1981 | Australia . |
| 2 236 277 | 3/1991 | United Kingdom . |
| 8803517 | 5/1988 | WIPO . |
| 9101880 | 2/1991 | WIPO . |

*Primary Examiner*—Jeff H. Aftergut
*Attorney, Agent, or Firm*—Royston, Rayzor, Vickery, Novak & Druce, L.L.P.

[57] ABSTRACT

Invention relates to a method and apparatus for laminating glass sheets by placing a plastic film between the glass sheets. A refrigerated space (1) arranged above a laminating space (2) contains a plurality of unwinding units (6) for film rolls and therebelow a conveyor (9) taking up a film unwound from a roll. The laminating space (2) includes an intermediate conveyor (10) onto which a film sheet is transferred for heating prior to transferring said film sheet onto a glass sheet advancing on a laminating conveyor (4).

10 Claims, 2 Drawing Sheets

METHOD AND APPARATUS FOR LAMINATING GLASS SHEETS

The present invention relates to a method and apparatus for laminating glass sheets by placing a plastic films between the glass sheets. The apparatus includes a refrigerated space for the storage of rolls of plastic film and a laminating space provided with a laminating conveyor for carrying glass sheets to be laminated as well as with a hoisting device for picking up a glass sheet from the laminating conveyor.

The applications of laminated glasses include various safety glasses (protection of property, bullet proofing), sound-proofing glasses in hotels and airports, ultraviolet radiation controlling glasses, display windows etc.

Lamination is usually effected by using a PVB-plastic film, which film rolls must be held in a cold storage at less than 10° C. in order to prevent the film layers from sticking to each other.

One problem with the prior known laminating methods and equipment is that a film transferred from a cold film roll onto a warmer glass sheet shrinks upon heating, whereby the film edges may even contract inside the glass edge since the contraction between glass sheets does not occur controllably and evenly. Therefore, the film must be provided with a considerable shrinkage allowance. Another problem is that, when changing the glass width, the film-roll unwinding unit must be reloaded with a new film roll which must be brought over from a separate cold storage of film rolls. This inconvenient roll replacement is often neglected if the new glass width is just slightly less than the width of a film roll already in operation. However, this increases the amount of film reject, adding to the price of a final product.

An object of the invention is to provide an improved method and apparatus for laying a plastic film between in view of minimizing the film reject and speeding up the film handling.

This object is achieved with a method as set forth in the annexed claim 1 and with an apparatus as set forth in claim 2 or 7.

Figure 2:
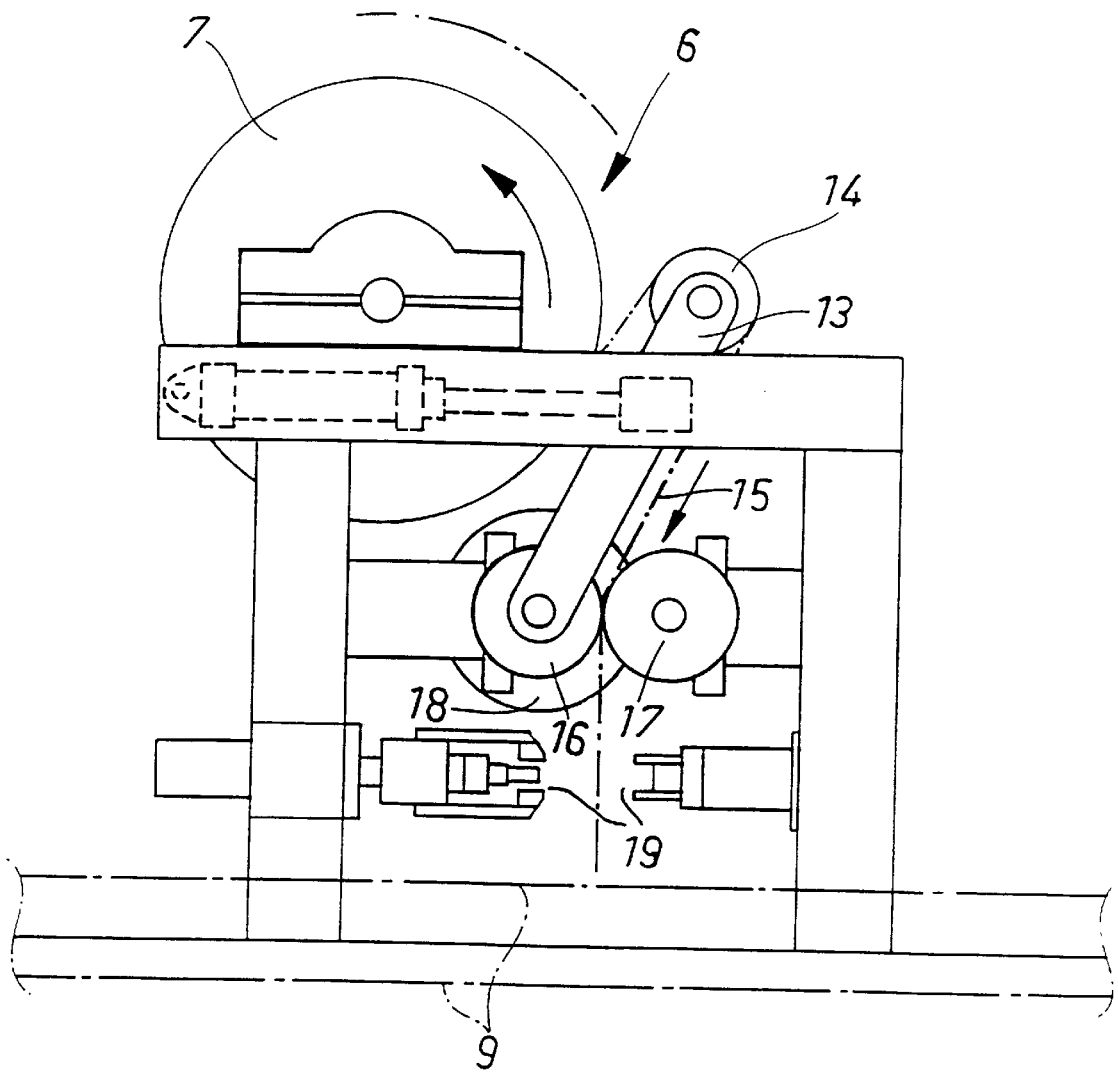

One exemplary embodiment of the invention will now be described in more detail with reference made to the accompanying drawings, in which FIG. 1 shows a lengthwise vertical section of an apparatus of the invention and FIG. 2 is a more detailed view of a film-roll unwinding unit included in the apparatus.

The film used in lamination is stored as rolls 7 in a refrigerated space 1, located above a laminating space 2. The spaces 1 and 2 are separated from each other by means of a floor 3 provided with a gap 11 for passing the film through. The laminating space 2 is provided with a horizontal laminating conveyor 4 and a hoisting device 5 for picking up a glass sheet from the conveyor 4 and for placing the same on top of another glass sheet and a plastic film covering the latter. Since the glass sheets to be laminated have highly varying dimensions, it is necessary to be able to vary also the dimensions of plastic film sheets in view of cutting down the film reject as much as possible.

According to the invention, the refrigerated space 1 contains a plurality of unwinding units 6 for film rolls 7. The rolls 7 included in various units 6 may have film widths differing from each other with a suitable gradation. FIG. 1 illustrates six different units but the number of units can be increased as necessary, e.g. the number shown in FIG. 1 can be doubled, whereby another group of units 6 could be located on the other side of the gap 11. The rolls 7 are carried from a separate cold storage by means of a conveyor 8 to the units 6. A given unit 6 includes film of a given width, whereby the glass width at a loading end (upstream of a washing machine) serves as a basis to start an unwinding unit 6 provided with a proper film width at a given time.

An unwinding mechanism shown in FIG. 2 is used for delivering the film from the roll 7 onto a take-up conveyor 9. The unwinding mechanism includes a drawing roll 14 journalled to brackets 13 pivotable by cylinders, as well as a pair of rolls 16, 17 forming a drawing nip, a reducer-equipped motor 18 for driving the roll 16, as well as a cutter element 19 for a film 15. The unwinding distance of film 15 is measured and it is precision cut to match the length of glass sheets to be laminated (with shrinkage allowance in mind) by means of the cutter element 19. On the take-up conveyor 9 the film tensile stress is relieved.

An auxiliary conveyor at the end of the conveyor 9 is used for carrying the film through the gap 11 onto an intermediate conveyor 10, included in the laminating space 2 and having a temperature which is substantially equal to that of glasses to be laminated. While on the conveyor 10, the film temperature rises and the film shrinks. Thus, the equalization of film temperature and the elimination of contractions are achieved prior to bringing the film onto a glass sheet. The conveyors 9 and 10 can be horizontal belt conveyors. At least the conveyor 10 should have a sufficient length for taking up the entire straightened length of a film sheet.

A vertical auxiliary conveyor 12 is used for carrying a film sheet from the intermediate conveyor 10 onto a glass sheet advancing on the laminating conveyor 4. The conveyors 4 and 12 operate at an equal speed and, thus, the film can be set precisely according to the dimensions of a glass sheet.

With the exception of the roll width, said unwinding units 6 are identical and each provided with its own cutter element 19. Thus, each of the units 6 is in turn capable of an independent action and, thus, a film width desired at any given time can be selected merely by starting a proper unwinding unit 6.

It is obvious that the structural details of the invention can be varied in many ways within the scope of the annexed claims.

I claim:

1. A method for laminating glass sheets by placing a plastic film between the glass sheets, said method comprising:
   providing a containing refrigerated space that stores a plurality of plastic film rolls and a plurality of unwinding units, and a laminating space having a laminating conveyor for carrying glass sheets to be laminated and a hoisting device for picking up glass sheets from said laminating conveyor;
   unwinding a film sheet from one of said plastic rolls and cutting the sheet to desired lengths;
   conveying a cut film sheet upon a film conveyor that takes up the cut film sheet; and
   providing an intermediate conveyor, said intermediate conveyor being disposed adjacent said film conveyor and within said laminating space for receiving a film sheet from said refrigerated space and for heating the film sheet prior to passing the film sheet onto a glass sheet advancing on said laminating conveyor.

2. An apparatus for laminating glass sheets by placing a plastic film between the glass sheets, said apparatus comprising:
   a containing refrigerated space for the storage of plastic film rolls, said refrigerated space being provided with a plurality of unwinding units for unwinding film sheets from plastic rolls and cutting the sheets to a desired length, said refrigerated space being further provided with a film conveyor for taking up a film sheet unwound from the roll of a selected unwinding unit and cut to a desired length;

a laminating space, said laminating space being provided with a laminating conveyor for carrying glass sheets to be laminated and a hoisting device for picking up a glass sheet from said laminating conveyor; and an intermediate conveyor, said intermediate conveyor being disposed adjacent said film conveyor and within said laminating space that receives a film sheet directly from said refrigerated space and that heats the film sheet prior to passing the film sheet onto a glass sheet advancing on said laminating conveyor.

3. An apparatus as set forth in claim 2, said refrigerated space and said laminating space are on top of each other and said refrigerated and laminating spaces are separated from each other by a floor, said floor having a gap for passing the film sheet from said refrigerated space to said laminating space.

4. An apparatus as set forth in claim 3, wherein said refrigerated space is located above said laminating space.

5. An apparatus as set forth in claim 4, wherein, with the exception of the roll width, roll unwinding units are substantially identical, each said unwinding unit being provided with a cutter element for cutting the film to sheets of a desired length.

6. An apparatus as set forth in claim 4, wherein said film conveyor and said intermediate conveyor are each horizontal belt conveyors, said intermediate conveyor having a length which is at least equal to the maximum length of a glass sheet to be laminated.

7. An apparatus as set forth in claim 3, wherein said film conveyor and said intermediate conveyor are each horizontal belt conveyors, said intermediate conveyor having a length which is at least equal to the maximum length of a glass sheet to be laminated.

8. An apparatus as set forth in claim 3, wherein, with the exception of the roll width, said roll unwinding units are substantially identical, each said unwinding unit being provided with a cutter element for cutting the film to sheets of a desired length.

9. An apparatus as set forth in claim 2, wherein said film conveyor and said intermediate conveyor are each horizontal belt conveyors, said intermediate conveyor having a length which is at least equal to the maximum length of a glass sheet to be laminated.

10. An apparatus as set forth in claim 2, wherein said refrigerated space is located above said laminating space.

* * * * *